(12) United States Patent
Richardson

(10) Patent No.: US 11,630,652 B2
(45) Date of Patent: *Apr. 18, 2023

(54) FACILITATION OF FLEXIBLE PLATFORM USER INTERFACES

(71) Applicant: Jean Marie Richardson, Brookhaven, GA (US)

(72) Inventor: Jean Marie Richardson, Brookhaven, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,399

(22) Filed: Apr. 28, 2022

(65) Prior Publication Data

US 2022/0253292 A1  Aug. 11, 2022

Related U.S. Application Data

(63) Continuation of application No. 17/216,589, filed on Mar. 29, 2021, now Pat. No. 11,321,060, which is a (Continued)

(51) Int. Cl.
*G06F 11/34* (2006.01)
*G06F 8/38* (2018.01)
*G06F 9/451* (2018.01)
*H04L 67/306* (2022.01)
*H04L 67/50* (2022.01)
(Continued)

(52) U.S. Cl.
CPC ............... *G06F 8/38* (2013.01); *G06F 9/452* (2018.02); *G06F 11/34* (2013.01); *H04L 67/1001* (2022.05); *H04L 67/306* (2013.01); *H04L 67/535* (2022.05); *G06F 40/106* (2020.01); *G06F 40/174* (2020.01); *G06F 40/186* (2020.01)

(58) Field of Classification Search
CPC .... G06F 40/106; G06F 40/174; G06F 40/186; G06F 8/38; G06F 9/452; G06F 11/34; H04L 67/10; H04L 67/22; H04L 67/306
See application file for complete search history.

(56) References Cited

U.S. PATENT DOCUMENTS 5,533,182 A * 7/1996 Bates .................. G06F 3/16
715/821
7,818,419 B1  10/2010 McAllister et al.
(Continued)

OTHER PUBLICATIONS

Office Action dated Jun. 14, 2018 for U.S. Appl. No. 15/940,488, 26 pages.
(Continued)

*Primary Examiner* — Alvin H Tan
(74) *Attorney, Agent, or Firm* — Amin, Turocy & Watson, LLP

(57) ABSTRACT

In response to a user identity request, a system can receive user identity data associated with the user identity from a first mobile device. Based on the user identity data, the system can allocate an interface template to the user identity, wherein the interface template comprises scorecard data, from a second mobile device, associated with a scoring parameter related to an input field of the interface template. Furthermore, the system can prompt an input, via the first mobile device, to the input field of the interface template. Additionally, in response to receiving input data associated with the input, the system can compare the input data to the scoring parameter.

20 Claims, 12 Drawing Sheets

Related U.S. Application Data continuation of application No. 15/940,488, filed on Mar. 29, 2018, now Pat. No. 10,996,933.

(51) Int. Cl.
  *H04L 67/1001* (2022.01)
  *G06F 40/174* (2020.01)
  *G06F 40/186* (2020.01)
  *G06F 40/106* (2020.01)

(56) References Cited

U.S. PATENT DOCUMENTS

| | | | |
|---|---|---|---|
| 7,904,922 B1 | 3/2011 | Haberman et al. | |
| 8,379,053 B1 | 2/2013 | Phillips et al. | |
| 9,292,504 B2 | 3/2016 | Khalil et al. | |
| 9,774,895 B2* | 9/2017 | Chang | H04N 21/442 |
| 9,912,768 B1* | 3/2018 | Choi | H04L 67/535 |
| 9,990,404 B2* | 6/2018 | Agarwal | G06Q 10/10 |
| 10,063,645 B2* | 8/2018 | Yavilevich | H04L 67/535 |
| 10,108,977 B2* | 10/2018 | Yi | G06Q 30/0242 |
| 10,402,465 B1* | 9/2019 | Jain | H04L 67/535 |
| 10,509,831 B2 | 12/2019 | Yehaskel | |
| 2003/0154180 A1 | 8/2003 | Case et al. | |
| 2006/0161511 A1* | 7/2006 | Berstis | H04L 67/535 |
| 2006/0265258 A1* | 11/2006 | Powell | G06Q 10/10 |
| | | | 705/327 |
| 2008/0189608 A1 | 8/2008 | Nurmi | |
| 2009/0081629 A1 | 3/2009 | Billmyer et al. | |
| 2011/0010297 A1 | 1/2011 | Sisodraker | |
| 2013/0282605 A1 | 10/2013 | Noelting | |
| 2014/0244532 A1 | 8/2014 | Budzienski et al. | |
| 2014/0330649 A1 | 11/2014 | Lyren et al. | |
| 2015/0242374 A1* | 8/2015 | Kong | G06F 40/106 |
| | | | 715/201 |
| 2017/0270485 A1* | 9/2017 | Meier | G06Q 10/06398 |
| 2018/0315084 A1 | 11/2018 | Savage et al. | |
| 2019/0012307 A1 | 1/2019 | Ling et al. | |
| 2019/0073606 A1* | 3/2019 | Columbia-Walsh | G06N 20/00 |

OTHER PUBLICATIONS

Office Action dated Oct. 5, 2018 for U.S. Appl. No. 15/940,488, 22 pages.
Office Action dated Mar. 29, 2019 for U.S. Appl. No. 15/940,488, 22 pages.
Office Action dated Sep. 26, 2019 for U.S. Appl. No. 15/940,488, 27 pages.
Office Action dated Apr. 6, 2020 for U.S. Appl. No. 15/940,488, 36 pages.
Office Action dated Aug. 27, 2020 for U.S. Appl. No. 15/940,488, 38 pages.
Notice of Allowance dated Jan. 7, 2021 for U.S. Appl. No. 15/940,488, 25 pages.
Notice of Allowance dated Jan. 3, 2022 for U.S. Appl. No. 17/216,589, 59 pages.

* cited by examiner

FACILITATION OF FLEXIBLE PLATFORM USER INTERFACES

RELATED APPLICATIONS

The subject patent application is a continuation of, and claims priority to each of, U.S. patent application Ser. No. 17/216,589, filed Mar. 29, 2021, and entitled "FACILITATION OF FLEXIBLE PLATFORM USER INTERFACES," which is a continuation of U.S. patent application Ser. No. 15/940,488 (now U.S. Pat. No. 10,996,933), filed Mar. 29, 2018, and entitled "FACILITATION OF FLEXIBLE PLATFORM USER INTERFACES," the entireties of which priority applications are hereby incorporated by reference herein.

TECHNICAL FIELD

This disclosure relates generally to facilitating user interfaces via a cloud-based platform. More specifically, this disclosure relates to facilitating an application service and data analytics based on data inputs in the platform and user interface interaction.

BACKGROUND

In a software as a service (SaaS) model, users gain access to application software and databases. Cloud providers manage the infrastructure and platforms that run the applications. SaaS is sometimes referred to as "on-demand software" and can be priced on a pay-per-use basis or using a subscription fee. In the SaaS model, cloud providers install and operate application software in the cloud and cloud users access the software from cloud clients. Cloud users do not manage the cloud infrastructure and platform where the application runs. This eliminates the need to install and run the application on the cloud user's own computers, which simplifies maintenance and support. Cloud applications differ from other applications in their scalability, which can be achieved by cloning tasks onto multiple virtual machines at run-time to meet changing work demand. Load balancers can distribute the work over a set of virtual machines. This process is transparent to the cloud user, who sees only a single access-point. To accommodate a large number of cloud users, cloud applications can be multitenant, meaning that any machine can serve more than one cloud-user organization.

The above-described background relating to a SaaS is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
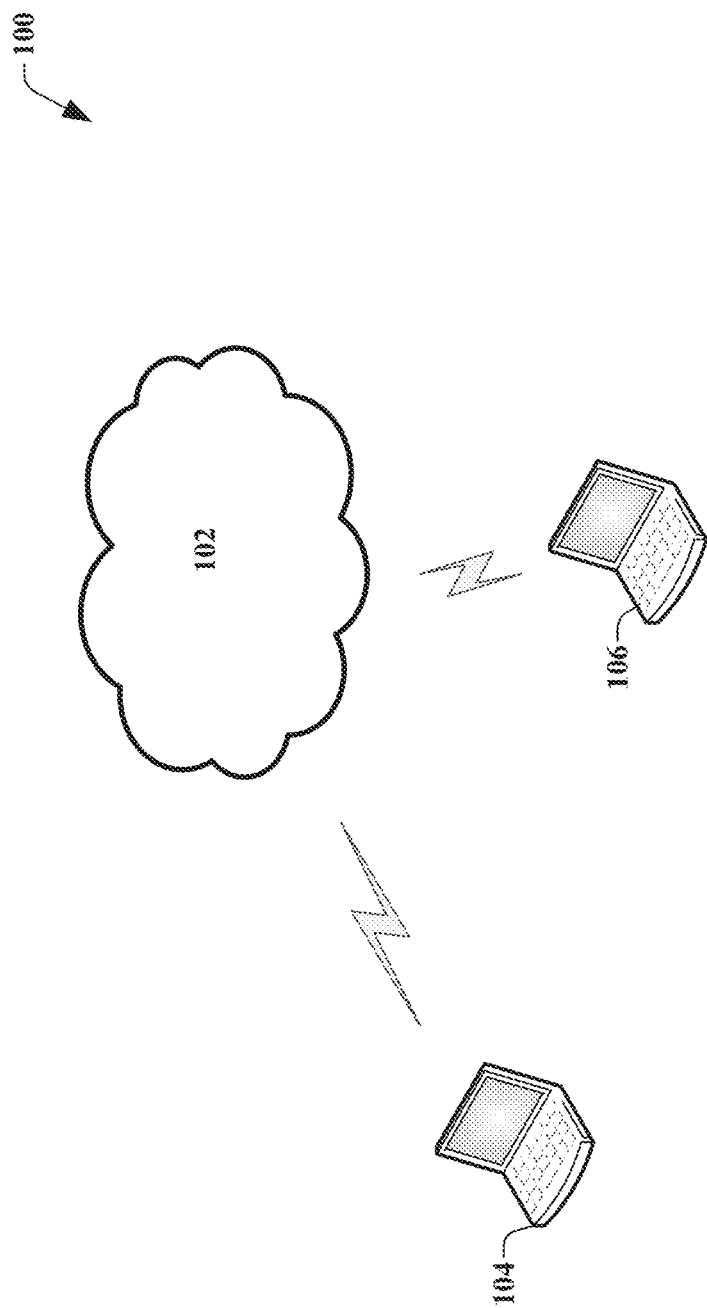
FIG. 1 illustrates an example wireless network comprising a software as a service platform for collaborative digital portfolio user interfaces according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a software as a service platform between mobile devices and network devices.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

Described herein are systems, methods, articles of manufacture, and other embodiments or implementations that can facilitate collaborative digital portfolio user interfaces. Facilitating collaborative digital portfolio user interfaces can be implemented in connection with any type of device with a connection to the communications network such as: a mobile handset, a computer, a handheld device, a laptop, or the like.

The digital portfolio system can generate an email based on user data being loaded into the digital portfolio system, and send an electronic template to the user based on the user data. The digital portfolio system can also cross-reference the templates against an email list to determine which email user should receive a specific template (e.g., professional template, athlete template, student template, etc.). The template can be edited by the user to generate his/her portfolio. The portfolio (a.k.a. digital portfolio, profile, user profile, user identity) can further be edited with user data to target specific schools or professions. The digital profile can also be used as a digital business card. Furthermore, the terms of service can be different based on a criterion of the user of the user profile. For example, parents of minor children can accept the terms of service of user profiles created for minors because minors cannot legally execute a contract.

Additionally, the user can pick several templates, from which to build his/her digital portfolio, to be associated with their user identity. For example, if the student is an athlete, then the student can build their profile based on the student template and the athlete template. However, once a condition has been satisfied (e.g., user age change, employment change, season, life event, etc.), the template can automatically convert to another template and/or amend categorical fields and/or data. For example, if a student in college reaches the age of twenty-one, when most college students graduate and pursue a career, the template can automatically be converted to a professional template. Although the professional template can comprise the same and/or similar demographic and/or personal information associated with the college student, specific fields can be converted to fields relevant to the college student's profession. For example, scholastic factors and/or affiliations (e.g., standardized aptitude test (SAT), extracurricular activities, fraternity/sorority organization, etc.) can be converted to fields professional certifications and/or affiliations (e.g., State Bar passage, Six Sigma, National Bar Association, certifications, etc.) once the college student reaches the age of twenty-one.

Alternatively, information that is relevant to the college student's college matriculation and professional career can be automatically transferred to the professional template and populated under the correct field. For example, if a college student's major is electrical engineering, then his/her major can also be transferred to his/her professional template as he/she will possibly be looking for employment in the electrical engineering industry. Additionally, the system can provide the college student with a pre-populated view (e.g., indicating data and/or fields to be removed, data and/or fields to be updated, and/or data and/or fields to remain the same) of what his/her profile can look like once fully converted to a professional profile. Consequently, the student can decide whether to keep a field to be auto-populated or not. The student can also decide to add or remove fields from a template based on the student's needs.

In one or more alternative embodiments, a moderator can set criteria for a user (e.g., student, athlete, professional, etc.) of the system and a contributor (e.g., college admissions, coach, employer, etc.). For example, if a coach is looking to recruit a high school student baseball player that is a pitcher with at least a 3.5 grade point average (GPA), then the coach (e.g., contributor) can set this as criteria within a moderator portal. These criteria can then modify the parameters of the athlete template so that GPA and athletic position become fields of the athlete template, thus prompting all new users to enter their respective GPAs and athletic positions. Additionally, noting that some previous users may not have had to enter their GPA and/or athletic positions, an automated email can be generated and sent to the previous users alerting them that one or more new fields have been updated within the athletic template and prompting them add the additional information regarding their GPA and/or athletic position. All information can be stored in a database and accessible via the moderator portal to identify student athletes that meet his/her criteria.

The matching of templates can be based on how the user completes their registration profile. Additionally, the templates can be pulled from various templates to make a profile for a user. For example, the user can receive a primary digital portfolio with x number of templates. However, the user can make up their digital portfolio based on any choice of the templates (e.g., student, athlete, professional). Consequently, the templates provided for a student can all be version specific. For instance, a student can receive one version of a template that can apply across his/her digital profile, an athlete can receive another version that can apply across his/her profile, and a professional can receive yet another version that can apply across his/her profile. Based on whether the user is defined as a student, athlete, or professional, the templates can be more reflective of such. For example, a version geared toward the professional, can generate a template that takes a deep dive into his/her professional qualifications and only present certain aspects of their student and/or athlete pages that are of a level to support the fact that the overall profile is tailored toward professional experiences in this particular situation. Thus, a profile for a professional can contain 60% professional information, 20% student information, and 20% athletic information. Conversely, a profile for a professional can comprise 100% professional data and no other template data. It should be noted that any combination and any percentage value is possible.

In one or more other embodiments, marketing can be automatically pushed to a user based on his/her profile and/or the user's interests. For example, if the system analyzes a user's profile and determines that the user is a Six Sigma Greenbelt, the system can send automated marketing to the user to ask the user if the user would like to take his/her Black Belt Certification Exam.

In one or more other embodiments, suggestions regarding collaborators and/or other relevant information can be sent to the user based on his/her registration data. For example, if a user is applying for a job with high schools as a guidance counselor, and the system determines that the user's qualifications, as based on their profile data, is within a defined degree (e.g., 20 percent) of relevancy to other positions (e.g., college football coach), then the system can suggest to the user that the user also apply for the other position(s) (e.g., college football coach) as well.

Weights (e.g., scorecard data) can also be assigned to the various fields of the user profile, such that the fields can each have an associated weight (e.g., score) based on how the user has answered and/or based on how one or more administrators might weight that answer. For example, a college looking for a star basketball player can weight the height (e.g., 80% weight given to the field of height) of the basketball player, as provided within a field of the basketball player's user profile, as being more relevant than the physical weight (e.g., 40% weight given to the field of weight) of the basketball player. Although another college looking for a football player, may weight the physical weight of the user more heavily than the height of the user. Accordingly, the height and physical weight numbers can be within a defined degree of tolerance as to what the college is looking for.

Likewise, if a student is applying for several colleges and the system determines that there are other colleges to which the student can apply based on the student's qualifications meeting the standards of the other colleges, then the system can suggest to the student to apply to those other colleges as well. Alternatively, if the system determines that with some additional extracurricular activities the student would be a good fit for a college that the student has not applied to, then the system can present this information to the student. For example, based on a student's profile with respect to an application to enroll in one school (e.g., University of Georgia) the system can determine that the student is enrolled in two extracurricular activities, and based on an admissions requirement (e.g., requires three extracurricular activities) set by another school (e.g., Georgia Tech), the system can send the student information pertaining to enrollment at the other school. The information sent to the student can comprise a suggestion (e.g., if you participate in at least one additional extracurricular activity, then you can also qualify to apply to Georgia Tech). Additionally, the system can compare the student's application to a previous student's application that was admitted to the same school(s) that the student is applying to. Thus, the system can provide the student with data on how the student compares to previously admitted students and generate data associated with the student's chances of admission.

In one or more other embodiments, a gamification component can prompt users to update their profiles from a gaming perspective. For example, the system can host a game, wherein certain fields of the user's profile are only opened for access once the user has completed some level of the game and/or reached a gamification goal. Additionally, users can be grouped together so that they can see individual progress of another group member's digital portfolio. For example, a prompt can be sent to a first user, indicating that a second user has attained a certain profile goal. Thus, the first user can be encouraged to perform some action to catch up or surpass the second user's profile completion.

The user can also have the option to select education (student), sports (athlete), or enterprise (professional) at the beginning of his/her registration process, which can then determine which fields are presented to the user to complete for a specific template. Additionally, an artificial intelligence component can prepopulate (e.g., name, school, city, etc.) the fields based on previous data entered into and/or obtained by the system.

In one or more embodiments the system can generate user profile analytics based on a number of times the profile has been shared, a number of times the profile has been viewed, a location associated with where a device displayed the profile, and/or the type of device where the profile was displayed (e.g., mobile device, tablet, desktop computer, etc.). Additionally, the system can generate data associated with what content of the profile was viewed the most. For example, how long was a specific video viewed as opposed to other profile information, when was the content viewed, time of day, etc. Based on the analytics, the users and the moderators can determine what content to post, when to post the content, and the best way maximize exposure. For example, based on where the scroll bar is relative to the page being viewed, data can be generated to determine what content on the page the viewer is most likely viewing. Additionally, a time value can be associated with how long the scroll bar remains in a certain areas, thus indicating how long a viewer is looking at a specific content. To further refine this process, the viewing page can be partitioned into several sections based on a defined degree of tolerance to determine what content is being viewed. For example, if the scroll bar is within a page partition that contains a picture of the user, then it can be assumed that the viewer is looking at the picture of the user. It should be noted that the page partitions do not have to be visible to the user, but can be hidden so as not to skew the view of the profile.

In one or more other embodiments, when a user profile is shared, a field can be displayed to request an input based on a type of lead. For example, a pop-up field can ask the user to confirm whether a lead is a qualified lead, an unqualified lead, an opportunity, a recurring customer, etc. Based on how the user populates the field, the lead data (e.g., what type of lead, how many leads, etc.) can be sent to the moderator. The lead data can help the digital profile user, and others that have access to the data, to assess the results of outreach associated with the digital profile of the user. Additionally, when a lead views a user profile, data associated with their viewing habits, as noted above, can be generated by the system.

The user can create the digital portfolio as non-published while he/she continues to edit the digital portfolio. When the user publishes the page, the viewer tracking can tell the viewer how many views the digital user profile is receiving, whether it is sent out via short messaging service (SMS), email, a web link, etc. The viewer tracking can also help the user to determine which subject lines, videos, durations are being better received based on analytic feedback that the user can receive from the system. Thus, a user can see how their profile views relate to other user profile views (e.g., is the content more effective than others) when compared.

In one or more other embodiments, the system can comprise a moderator account. The moderator account can have a different interface than that of the user profile account. However, the moderator account can reflect the user account. For example, the moderator account for a student can display the eligibility of users, graduation year, grade point average (GPA), scholastic aptitude test (SAT), honors, certifications, skills, class rank, etc. The aforementioned factors can also be searched within the moderator account. Alternatively, the moderator account for an enterprise account, associated with user profiles, can display a total number of shares, views, views by week, contact card downloads, average session times, etc.

In one or more other embodiments, the system can provide users with term renewal data associated with their user profiles under an enterprise account. For example, at the end of a term (e.g., thirty days before expiration), a universal administrator account can receive a notification indicating that a moderator account is going to be terminated. Based on this data, the administrator can contact a representative of the moderator account to persuade the moderator to renew the moderator account. However, if the moderator does not renew the moderator account, an option to develop a customer account can be sent to a previous individual user of the moderator account. Consequently, the user can use the system without an enterprise account, thus eliminating the need for a moderator and the moderator account. However, any intellectual property or branding associated with the enterprise account for the moderator can be removed from the user account (e.g., copyrights, trademarks, company photos, internal company data, etc.). Thus, some or all media associated with the moderator account can be removed from the user account. Alternatively, the user can still use any stock media (e.g., photos, videos, sound clips, etc.) from a default media library associated with the universal administrator account. Therefore, once a company cancels or fails to renew an enterprise account, the next time the user logs into their profile, the user can receive a link asking if the user wants to register under a customer account.

In one embodiment, described herein is a method comprising in response to a user identity request, receiving, by a wireless network device comprising a processor, user identity data associated with the user identity from a first mobile device. Based on the user identity data, the method can allocate, by the wireless network device, an interface template to the user identity, wherein the interface template comprises scorecard data, from a second mobile device, associated with a scoring parameter related to an input field of the interface template. The method can comprise prompting, by the wireless network device, an input, via the first mobile device, to the input field of the interface template. Furthermore, in response to receiving input data associated with the input, the method can comprise comparing, by the wireless network device, the input data to the scoring parameter.

According to another embodiment, a system can facilitate, in response to a user identity request, receiving user identity data associated with the user identity from a first mobile device. Based on the user identity data, the system can facilitate allocating an interface template to the user identity, wherein the interface template comprises scorecard data, from a second mobile device, associated with a scoring parameter related to an input field of the interface template. Additionally, the system can facilitate generating prompt data to prompt an input, via the first mobile device, to the input field of the interface template. Furthermore, in response to receiving input data associated with the input, the system can facilitate comparing the input data to the scoring parameter.

According to yet another embodiment, described herein is a machine-readable storage medium that can perform the operations comprising facilitating sending a user identity request to a first mobile device. In response to the facilitating the sending the user identity request, the operations can comprise receiving user identity data associated with the user identity from the first mobile device. Based on the user identity data, the operations can comprise allocating an interface template to the user identity, wherein the interface template comprises scorecard data associated with a scoring parameter related to an input field of the interface template. Furthermore, the operations can comprise prompting an input, via the first mobile device, to the input field of the interface template. Additionally, in response to receiving input data via the input field, the operations can comprise comparing the input data to the scoring parameter.

These and other embodiments or implementations are described in more detail below with reference to the drawings.

Referring now to FIG. 1, illustrated is an example wireless network 100 comprising a software as a service platform for collaborative digital portfolio user interfaces according to one or more embodiments.

The collaborative digital portfolio system can comprise a cloud-based architecture to facilitate SaaS. For example, a mobile device 104 can maintain a universal administrator account while a mobile device 106 can maintain a moderator account. Both mobile devices 104, 106 can communicate with each other over a cloud network 102 that hosts the SasS. However, the permissions and rights granted to the mobile devices 104, 106 can be different. For example, a universal administrator account maintained on the mobile device 104 can be responsible for setting up the moderator account hosted at the mobile device 106. The mobile device 104 can load moderators and send invites to the mobile device 106. The moderators can add users, send invites to users, host an account media library, search and sort users, export reporting, etc., via the mobile device 106. Alternatively, when the moderator account is within a defined period for expiration, a notification can be sent to the universal administrator account at the mobile device 104, and a notification can be sent to the moderator account at the mobile device 106. The notification can be sent from the cloud network 102 to notify the moderator account to renew a license and/or subscription associated with the SaaS, or the notification can be sent from the cloud network 102 to notify the universal administrator account to take an action in support of or against moderator account renewal.

Figure 2:
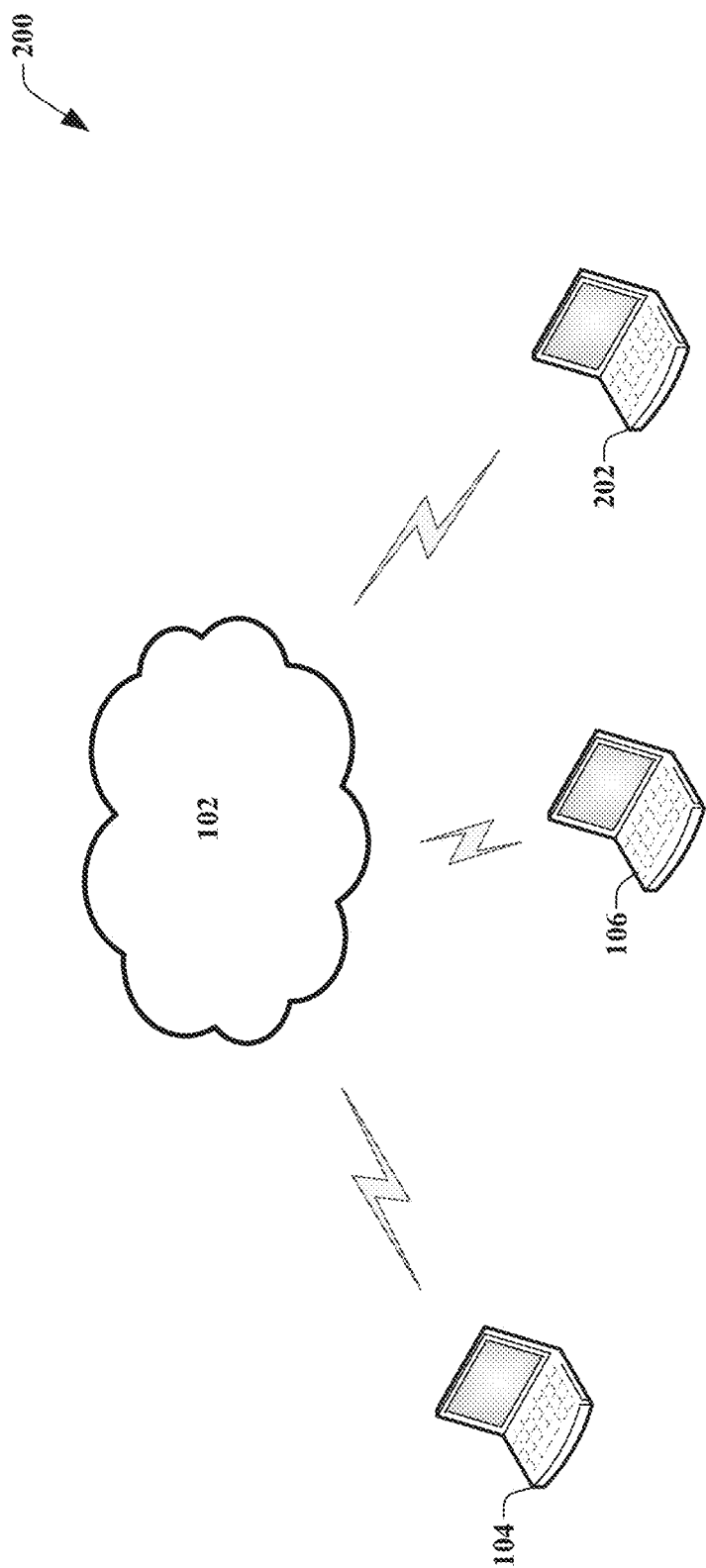
FIG. 2 illustrates an example wireless network comprising a software as a service platform for collaborative digital portfolio user interfaces according to one or more embodiments.

Referring now to FIG. 2, illustrated is an example wireless network 200 comprising a software as a service platform for collaborative digital portfolio user interfaces according to one or more embodiments. Repetitive description of like elements employed in other embodiments described herein is omitted for sake of brevity.

FIG. 2 depicts another mobile device 202. The mobile device 202 can be a user device with access to the cloud network 102. However, the mobile device 202 can be granted rights and privileges from the moderator account of the mobile device 106. For example, the mobile device 106 can add a user associated with the mobile device 202 to the digital portfolio platform. Once the user is added, a notification can be sent to the mobile device 202 prompting the user to register (e.g., set up email, set up password, etc.) with the cloud network 102. When the user of the mobile device 202 has registered with the cloud network 102, the user can be prompted to enter a code and/or to accept the terms of service associated with the cloud network 102. Based on the registration process and/or data entered by the user during the registration process, the user can be provided with a template page. For example, if the user indicated that the user is a student during the registration process, then the user can be sent a student-based template to complete his/her digital portfolio. The input fields associated with the student-based template can be default input fields and/or input fields selected by the moderator account for presentation to the user via the mobile device 202. In one or more embodiments, it is also possible for the user to be presented with various templates or a combination of templates based on the information entered during their registration process. The user can publish his/her digital profile, at any time, for others to view via their mobile devices. Alternatively, the moderator account can place time restraints and/or restrictions on when the user is able to publish his/her account.

Figure 3:
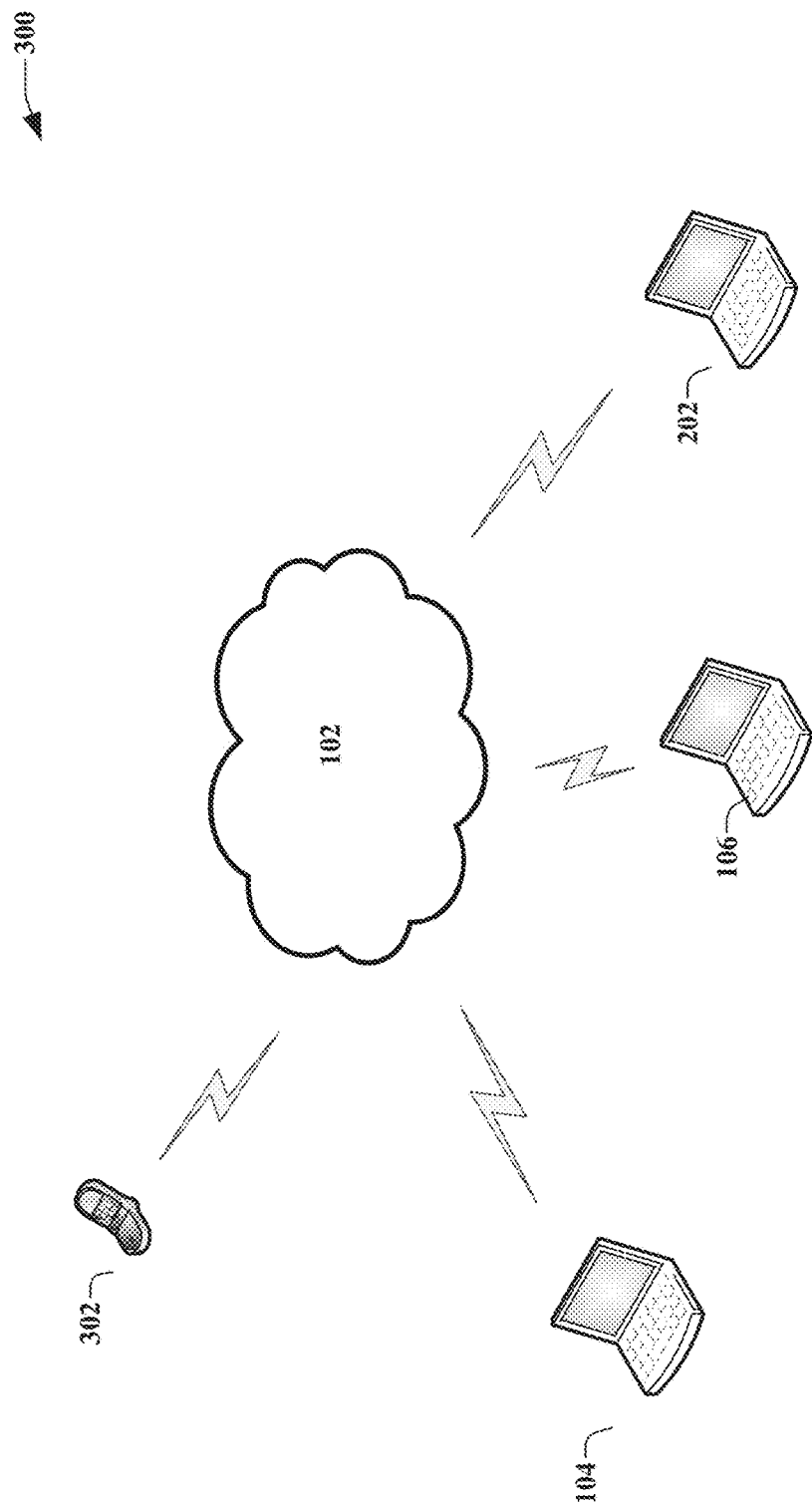
FIG. 3 illustrates an example wireless network comprising a software as a service platform for collaborative digital portfolio user interfaces according to one or more embodiments.

Referring now to FIG. 3, illustrated is an example wireless network 300 comprising a software as a service platform for collaborative digital portfolio user interfaces according to one or more embodiments. Repetitive description of like elements employed in other embodiments described herein is omitted for sake of brevity.

As depicted in FIG. 3, another mobile device 302 can communicate with the cloud network 102. However, the mobile device 302 can only read digital portfolios and not write, modify, and/or edit the digital portfolios. The mobile device 302 cannot have any administrator or moderator rights. Consequently, any data added to a digital portfolio of the user identity associated with the mobile device 202 can be seen by the mobile device 302. For example, after the user identity associated with the mobile device 202 publishes a digital portfolio associated with the user identity, then the digital portfolio can be viewed by the mobile device 302. The mobile device 302 can also receive (e.g., via text, SMS, email, hyperlinks, etc.) a notification that an update has been made to the digital portfolio of the mobile device 202. Based on the mobile device 302 viewing the digital portfolio, viewer tracking (e.g., analytics, viewer trends, viewer location, time viewed, date viewed, number of shares with others, impressions, clicks, downloads of virtual cards, calendar scheduling, time spent viewing a specific media of the digital portfolio, etc.) can be sent to the mobile devices 106, 202, 104. The mobile device 302 can also download a virtual contact card associated with the digital portfolio, wherein the virtual card is representative of the digital profile.

Figure 4:
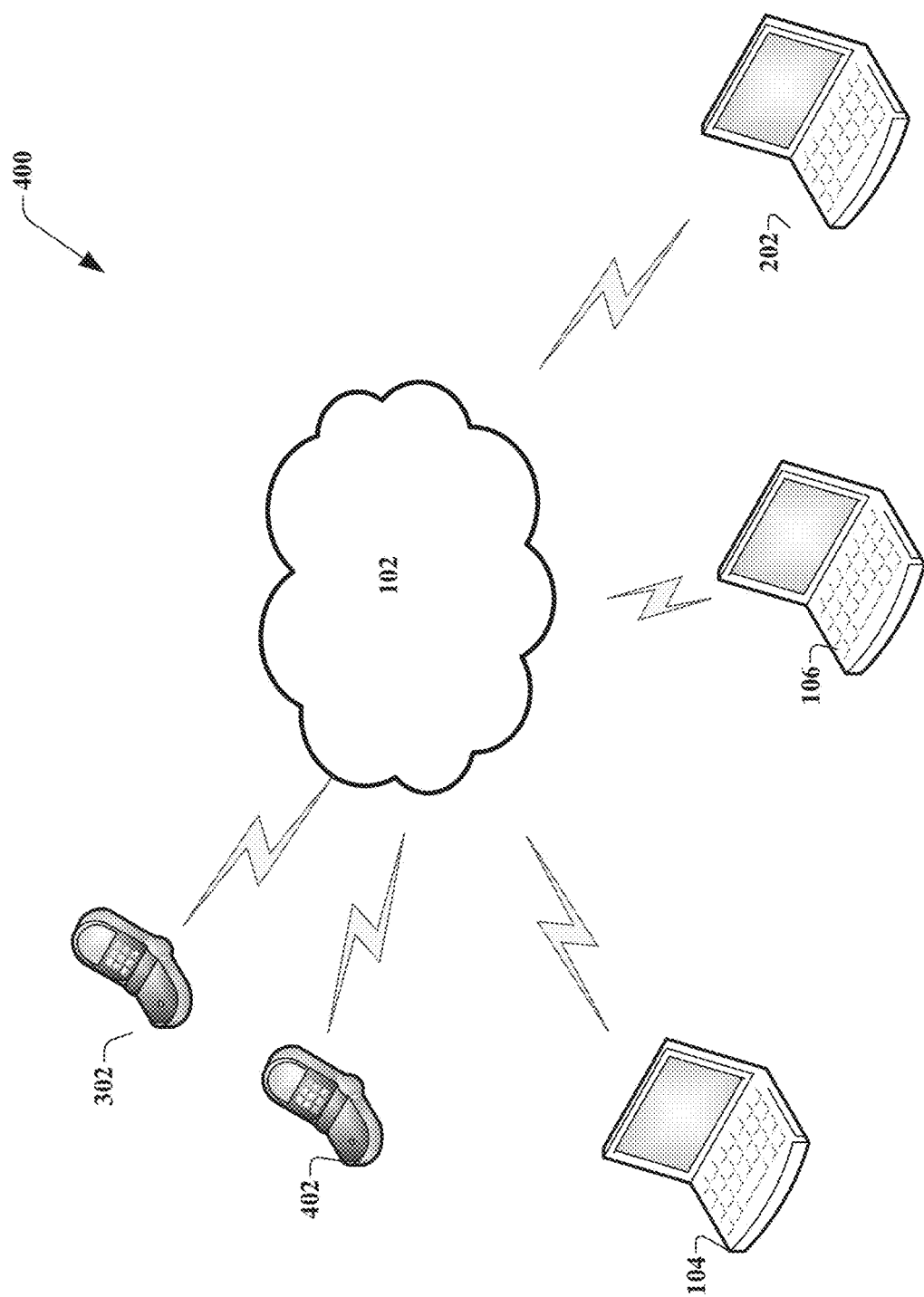
FIG. 4 illustrates an example wireless network comprising a software as a service platform for collaborative digital portfolio user interfaces with viewer analytics capabilities according to one or more embodiments.

Referring now to FIG. 4, illustrated is an example wireless network comprising a software as a service platform for collaborative digital portfolio user interfaces with viewer analytics capabilities according to one or more embodiments. Repetitive description of like elements employed in other embodiments described herein is omitted for sake of brevity.

In one or more other embodiments, the mobile devices 302, 402 can see viewer tracking (e.g., analytics, viewer trends, viewer location, time viewed, date viewed, number of shares with others, impressions, clicks, downloads of virtual cards, calendar scheduling, time spent viewing a specific media of the digital portfolio, etc.) associated with their respective views. For example, while viewing the digital portfolio of the mobile device 202, the mobile device 402 can display a representation that the mobile device 302 has viewed the digital portfolio ten times within the last three days, thus indicating that a user identity associated with the mobile device 302 is highly interested in the digital profile of the user identity associated with the mobile device 202.

Figure 5:
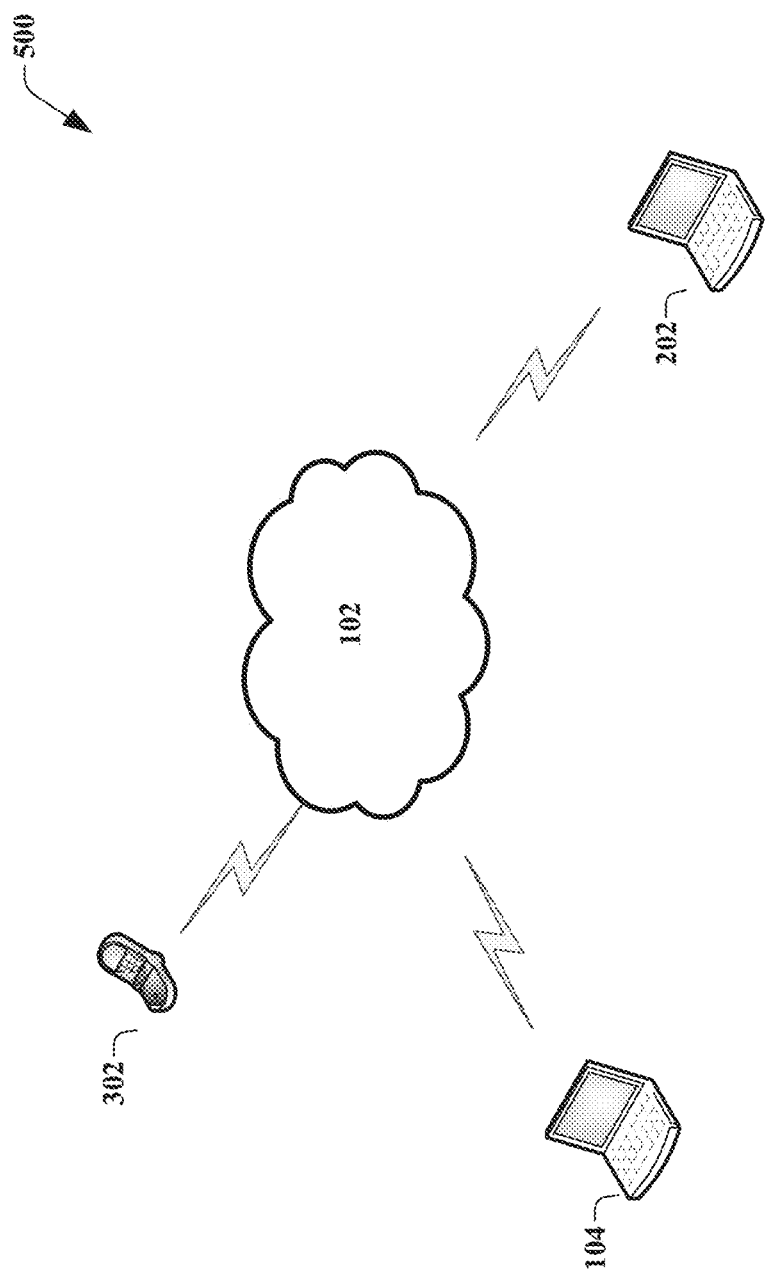
FIG. 5 illustrates an example wireless network comprising a software as a service platform for collaborative digital portfolio user interfaces utilizing an account termination procedure according to one or more embodiments.

Referring now to FIG. 5, illustrated is an example wireless network 500 comprising a software as a service platform for collaborative digital portfolio user interfaces utilizing an account termination procedure according to one or more embodiments. Repetitive description of like elements employed in other embodiments described herein is omitted for sake of brevity.

In one or more other embodiments, the system can provide users with term renewal data associated with their user profiles under an enterprise account. For example, at the end of a term (e.g., thirty days before expiration), the universal administrator account associated with mobile device 104 can receive a notification indicating that the moderator account associated with the mobile device 106 is going to be terminated. Based on this data, the administrator can contact a representative of the moderator account to persuade the moderator to renew the moderator account. However, if the representative does not renew the moderator account, an option to develop an external customer account can be sent to a previous individual user (e.g., user account associated with the mobile device 202) of the moderator account. Consequently, the user can use the system without an enterprise account, thus eliminating the need for a moderator and the moderator account.

Additionally, any intellectual property and/or branding associated with the enterprise account for the moderator can be removed from the user account (e.g., copyrights, trademarks, company photos, internal company data, etc.) when the moderator account associated with the mobile device 106 is terminated. Alternatively, the user account associated with the mobile device 202 can still use any stock media (e.g., photos, videos, sound clips, etc.) from a default media library associated with the universal administrator account associated with the mobile device 104. Once a company cancels or fails to renew an enterprise account, the next time the user logs in to their digital profile, the user can receive a link asking if the user wants to register under a customer account and proceed accordingly.

Figure 6:
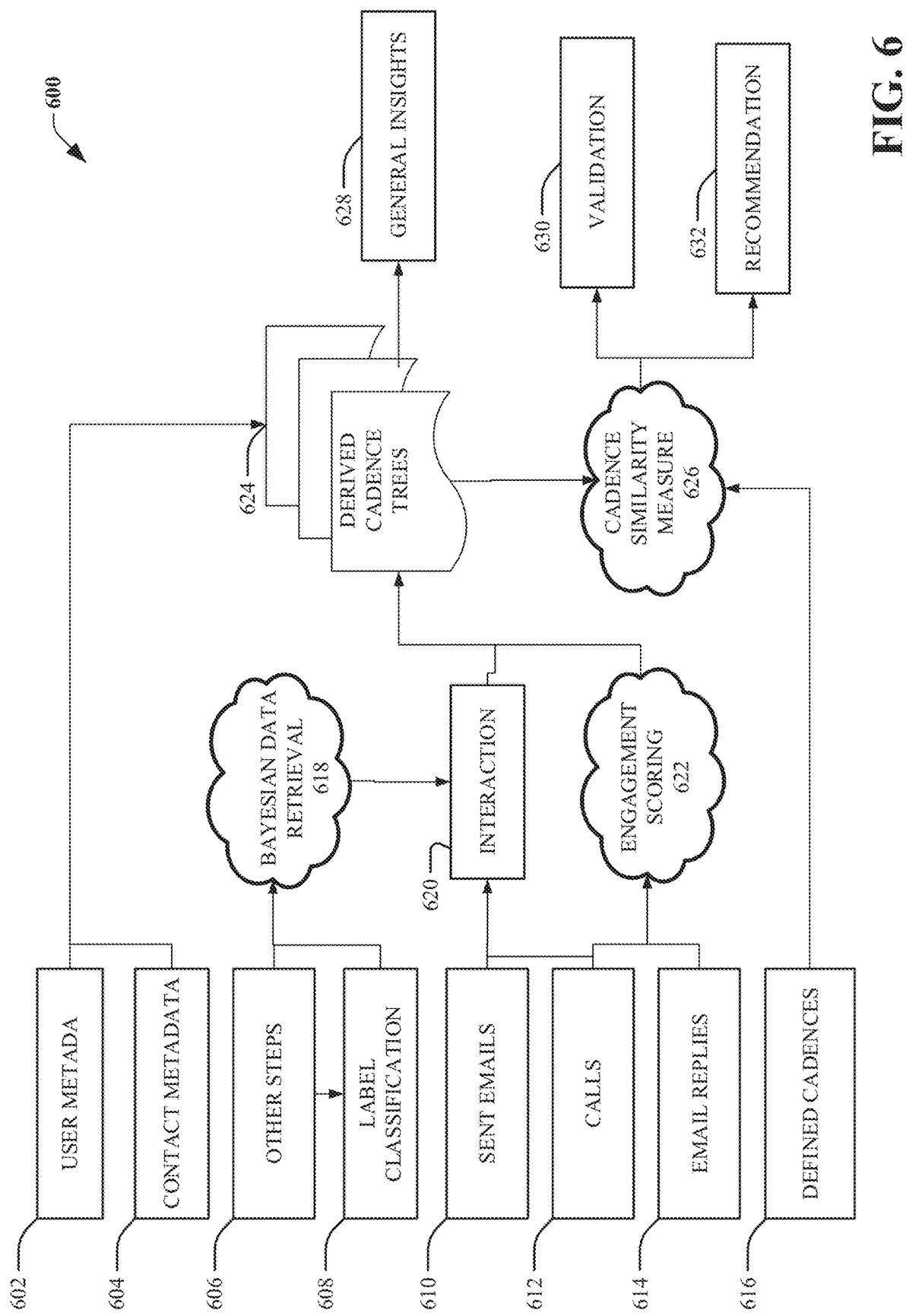
FIG. 6 illustrates an example schematic system block diagram for artificial intelligence related to a software as a service platform for collaborative digital portfolio user interfaces according to one or more embodiments.

Referring now to FIG. 6, illustrated is an example schematic system block diagram for artificial intelligence related to a software as a service platform for collaborative digital portfolio user interfaces according to one or more embodiments. Repetitive description of like elements employed in other embodiments described herein is omitted for sake of brevity.

It should also be noted that an artificial intelligence (AI) component can facilitate automating one or more features in accordance with the disclosed aspects. A memory and a processor as well as other components can include functionality with regard to the figures. The disclosed aspects in connection with a digital portfolio can employ various AI-based schemes for carrying out various aspects thereof. For example, a process for detecting one or more trigger events, reducing a number of input fields as a result of the one or more trigger events, and modifying one or more reported measurements, and so forth, can be facilitated with an example automatic classifier system and process. In another example, a process for penalizing data inputs while preferring another data input can be facilitated with the example automatic classifier system and process.

An example classifier can be a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that can be automatically performed. In the case of digital portfolios, for example, attributes can be a desired field for a user to provide input. In another example, the attributes can be a weight associated with a field of the user input.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to automatically populating a user field, modifying one or more user field inputs, restricting a field from being populated, and so forth. The criteria can include, but is not limited to, predefined values, field population tables or other parameters, service provider preferences and/or policies, and so on.

For example, a universal administrator account can load users into the cloud network 102 with coded sheet. The AI can send different registration pages (per a vertical platform enterprise versus educator/sports), which collect different data for the universal administrator based on a vertical solution. Thus, the AI can preload data already loaded by the universal administrator and/or preload implied data so that the user of the mobile device 202 increases registration efficiencies for a quicker on-boarding process. The AI can also determine if the account is not renewing and prompt user to renew individually, which can delete some or all previous account data.

As depicted in FIG. 6, user metadata 602 and contact metadata 604 can be sent to derived cadence trees 624. Other steps 606 of the registration process can be sent to a label classification 608 and a Bayesian data retrieval unit 618. Sent emails 610 and calls 612 can be sent to an interaction unit 620. Additionally, the calls 612 and email replies 614 can be sent to an engagement scoring unit 622. The interaction unit 620 can receive output data from the Bayesian data retrieval unit 618. Outputs from the interaction unit 620 and the engagement scoring unit 622 can be sent to the derived cadence trees 624. Thus, based on the user metadata 602, the contact metadata 604, the interaction unit 620 output, and the engagement scoring unit 622 output, the derived cadence trees can generate general insights at block 628 via AI and an output to be sent to a cadence similarity measure unit 626. The cadence similarity measure unit 626 can also receive defined cadences 616. Consequently, based on the defined cadences 616 and the derived cadence trees 624 output, the cadence similarity measure unit 626 can generate a validation at block 630 and/or a recommendation at block 632 via the AI.

Figure 7:
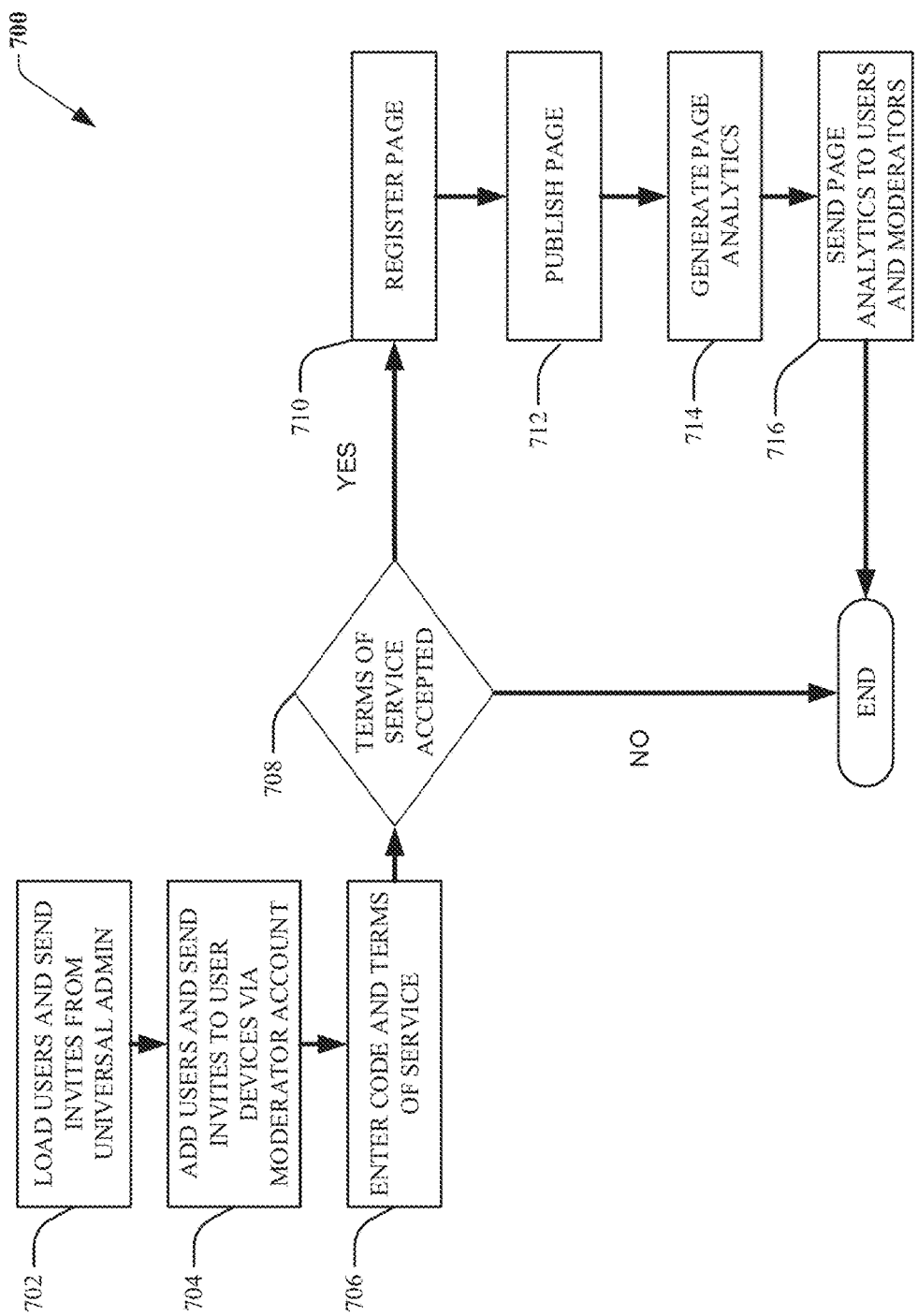
FIG. 7 illustrates an example schematic system flow diagram for a software as a service for collaborative digital portfolio user interfaces according to one or more embodiments.

Referring now to FIG. 7, illustrated is an example schematic system flow diagram 700 for a software as a service for collaborative digital portfolio user interfaces according to one or more embodiments. Repetitive description of like elements employed in other embodiments described herein is omitted for sake of brevity.

As depicted in the flow diagram of FIG. 7, at block 702, users can be loaded into the digital portfolio system and sent invites from the universal administrator. At block 704, a moderator can add users and send invites to user devices via a moderator account. At block 706, the user can enter a code and receive the terms of service associated with the account. If the user does not accept the terms of service at block 708 associated with the account, then the process can end. However, if the user does accept the terms of service at block 708, then the user can be presented with a registration page at block 710. The user can then edit and publish the page at block 712. Based on views of the page, the system can generate page analytics at block 714 and the page analytics can be sent to users and moderators at block 716 prior to the process ending.

Figure 8:
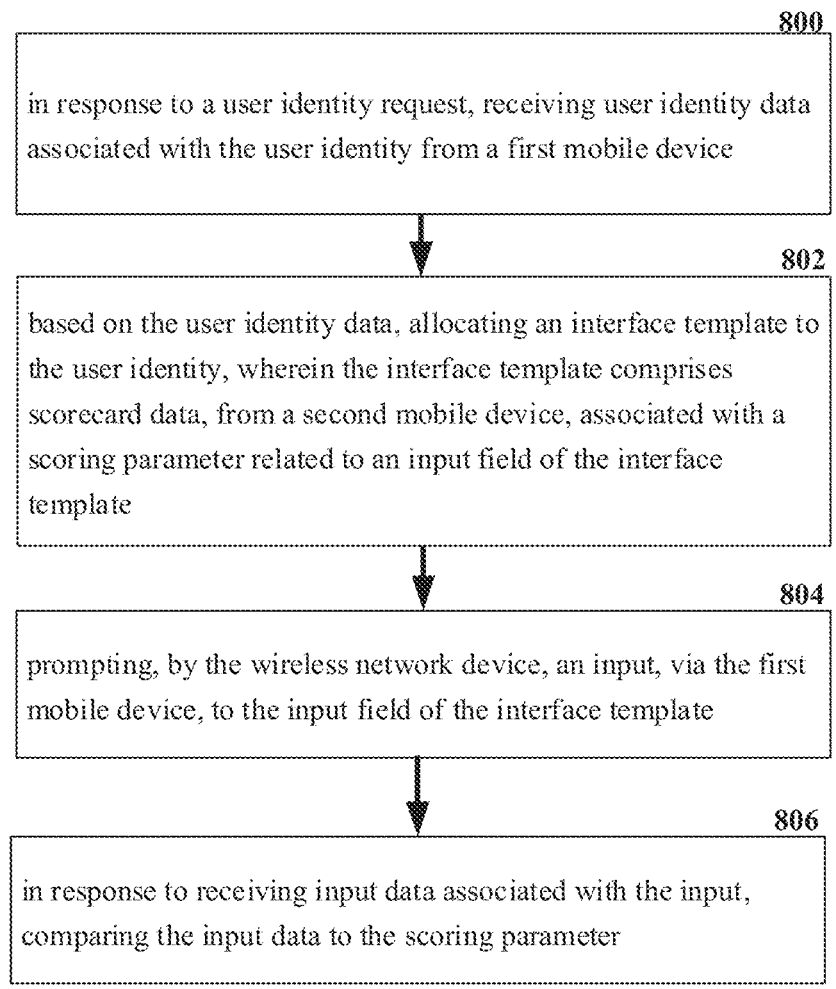
FIG. 8 illustrates an example schematic system block diagram for collaborative digital portfolio user interfaces according to one or more embodiments.

Referring now to FIG. 8, illustrated is an example schematic system block diagram for collaborative digital portfolio user interfaces according to one or more embodiments. Repetitive description of like elements employed in other embodiments described herein is omitted for sake of brevity.

In response to a user identity request, a method can comprise receiving, by a wireless network device comprising a processor, user identity data associated with the user identity from a first mobile device at element 800. Based on the user identity data, the method can comprise allocating, by the wireless network device, an interface template to the user identity at element 802, wherein the interface template comprises scorecard data, from a second mobile device, associated with a scoring parameter related to an input field of the interface template. The method can also comprise prompting, by the wireless network device, an input, via the first mobile device, to the input field of the interface template at element 804. Furthermore, in response to receiving input data associated with the input, the method can comprise comparing, by the wireless network device, the input data to the scoring parameter at element 806.

Figure 9:
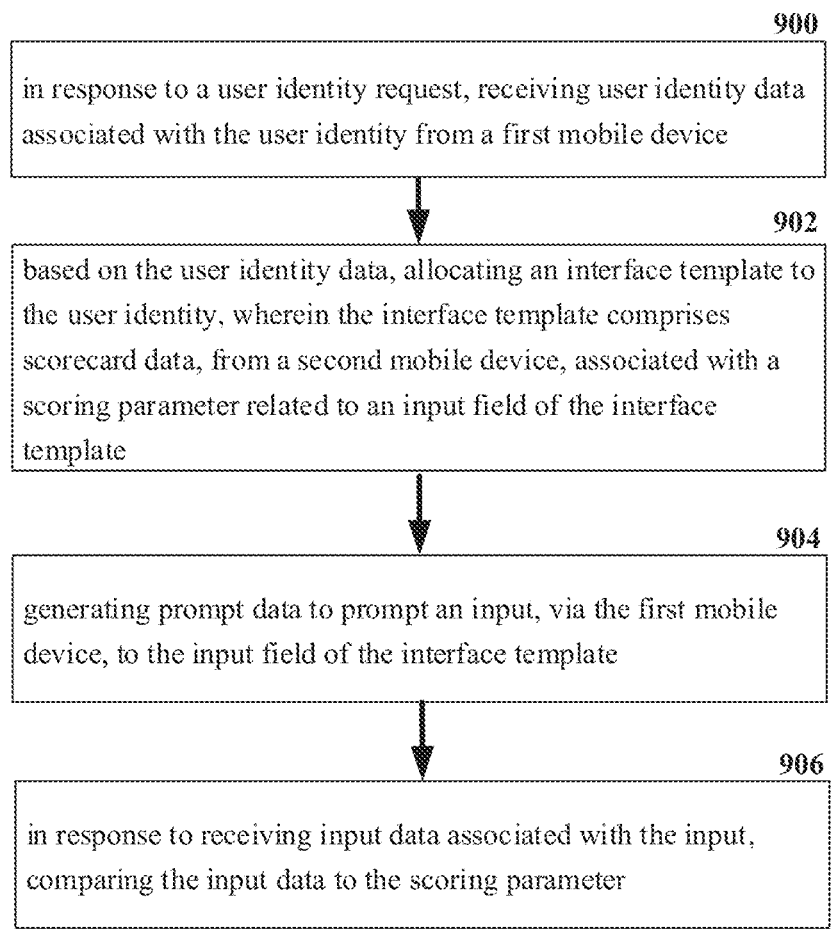
FIG. 9 illustrates an example schematic method block diagram for collaborative digital portfolio user interfaces according to one or more embodiments.

Referring now to FIG. 9, illustrated is an example schematic method block diagram for collaborative digital portfolio user interfaces according to one or more embodiments. Repetitive description of like elements employed in other embodiments described herein is omitted for sake of brevity.

In response to a user identity request, a system can comprise receiving user identity data associated with the user identity from a first mobile device at element 900. Based on the user identity data, the system can comprise allocating an interface template to the user identity at element 902, wherein the interface template comprises scorecard data, from a second mobile device, associated with a scoring parameter related to an input field of the interface template. At element 904, the system can comprise generating prompt data to prompt an input, via the first mobile device, to the input field of the interface template. Additionally, in response to receiving input data associated with the input, the system can comprise comparing the input data to the scoring parameter at element 906.

Figure 10:
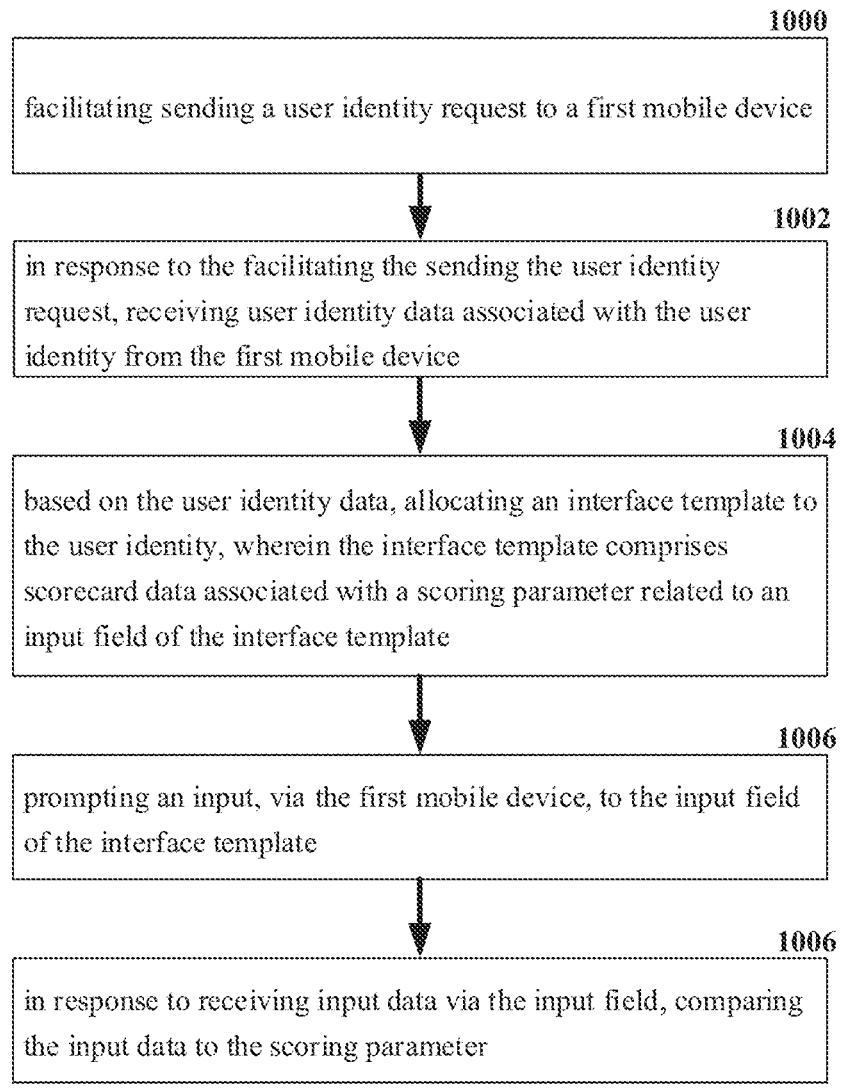
FIG. 10 illustrates an example schematic machine-readable medium block diagram for collaborative digital portfolio user interfaces according to one or more embodiments.

Referring now to FIG. 10, illustrated is an example schematic machine-readable medium block diagram for collaborative digital portfolio user interfaces according to one or more embodiments. Repetitive description of like elements employed in other embodiments described herein is omitted for sake of brevity.

At element 1000 a machine-readable medium can comprise facilitating sending a user identity request to a first mobile device. In response to the facilitating the sending the user identity request, the machine-readable medium can comprise receiving user identity data associated with the user identity from the first mobile device at element 1002. Additionally, based on the user identity data, the machine-readable medium can comprise allocating an interface template to the user identity at element 1004, wherein the interface template comprises scorecard data associated with a scoring parameter related to an input field of the interface template. Furthermore, the machine-readable medium can comprise prompting an input, via the first mobile device, to the input field of the interface template at element 1006, and in response to receiving input data via the input field, comparing the input data to the scoring parameter at element 1008.

Figure 11:
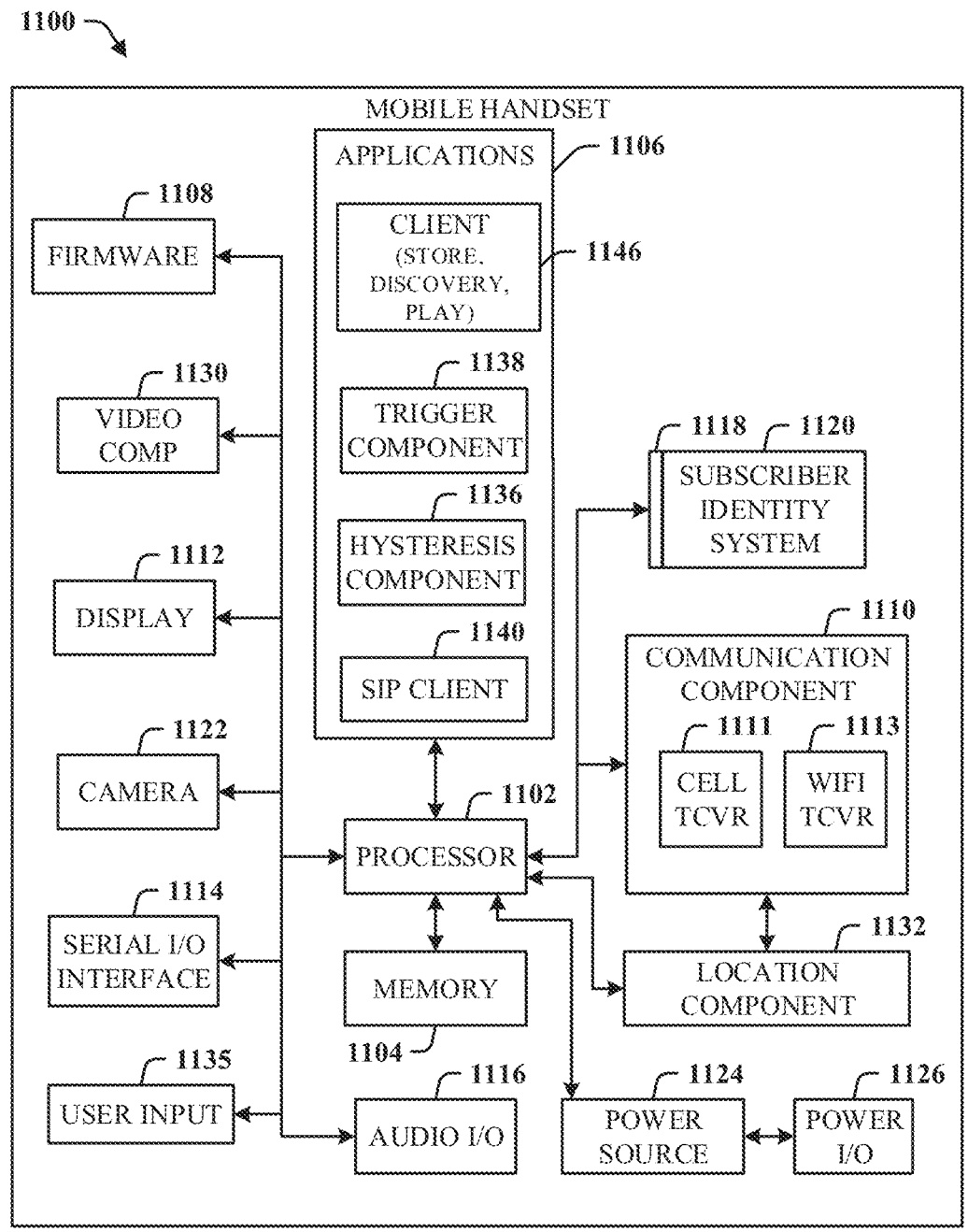
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
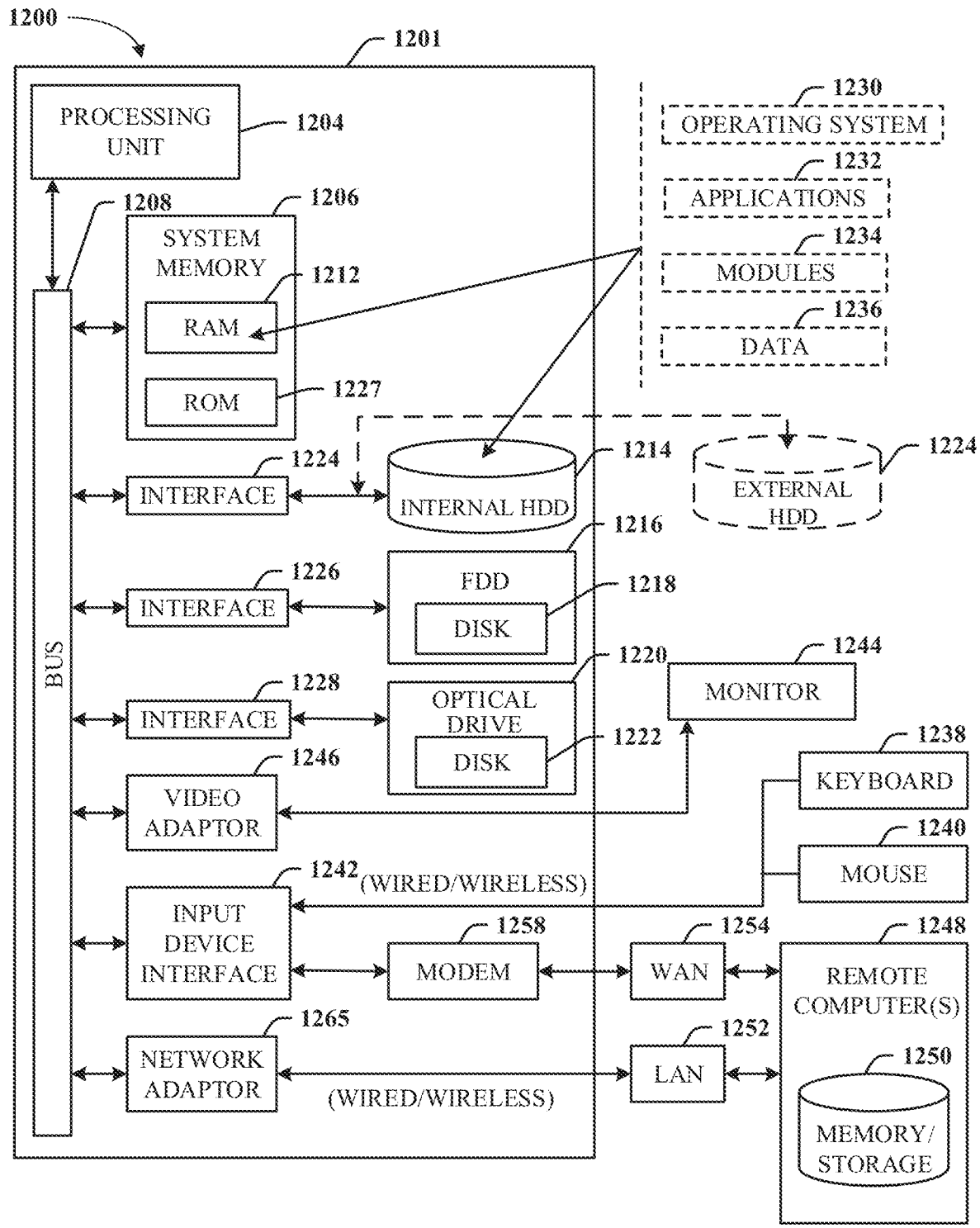
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by network equipment comprising a processor, an indication that a digital profile associated with a first identity of a first user has been shared with a first mobile device;
   in response to the digital profile being determined to have been viewed at the first mobile device in association with a second identity of a second user, generating, by the network equipment, time duration data representative of a length of time that a first content part associated with the digital profile was viewed at the first mobile device in association with the second identity, the first content part being different than a second content part associated with the digital profile, wherein the time duration data is based at least in part on a location of a user interface element of a user interface of the first mobile device in relation to the first content part and a previously defined partition of the digital profile that is not visible to the second user, wherein the previously defined partition is defined prior to the digital profile being viewed in association with the second identity, wherein the previously defined partition is different than the first content part, and wherein the first content part has been determined to be within the previously defined partition; and
   in response to the indication that the digital profile has been shared with the first mobile device, sending, by the network equipment to a second mobile device, viewer data representative of a number of times that the digital profile has been shared with the first mobile device, a type of the first mobile device, and the time duration data.

2. The method of claim 1, further comprising:
   generating, by the network equipment, output data to be sent to the first mobile device.

3. The method of claim 1, further comprising:
   allocating, by the network equipment, an interface template to the first identity, wherein the interface template comprises scorecard data, from the second mobile device, associated with a scoring parameter related to an input field of the interface template.

4. The method of claim 1, further comprising:
allocating, by the network equipment, an interface template to the first identity, wherein a first input field of the interface template is weighted differently than a second input field of the interface template.

5. The method of claim 1, further comprising:
allocating, by the network equipment, an interface template to the first identity; and
prompting, by the network equipment, an input, via the first mobile device, to an input field of the interface template.

6. The method of claim 1, further comprising:
in response to a defined function of time being determined to have been satisfied, facilitating, by the network equipment, switching from using a first input of a first interface template allocated to the first identity to using a second input of a second interface template.

7. The method of claim 1, wherein the interface template is a first interface template, and further comprising:
in response to a defined function of time being determined to have been satisfied, moving, by the network equipment, a first input field of a first interface template to a second input field of a second interface template.

8. A system, comprising:
a processor; and
a memory that stores executable instructions that, when executed by the processor, facilitate performance of operations, comprising:
receiving an indication that a digital profile associated with a first user has been shared with a first mobile device;
in response to a second user of the first mobile device being determined to have viewed the digital profile, generating time span data representative of a time span over which the second user has been determined to have viewed a first content part of the digital profile of the first user as opposed to a second content part associated with the digital profile of the first user, wherein the time span data is based at least in part on a location of a user interface element of the first mobile device relative to the first content part and a previously defined partition of the digital profile of the first user, wherein the previously defined partition is different than the first content part, and wherein the previously defined partition is defined prior to the second user being determined to have viewed the digital profile; and
in response to the indication that the digital profile has been shared with the first mobile device, sending, to a second mobile device, viewer data representative of a number of times that the digital profile has been shared with a third mobile device, a type of the third mobile device, and the time span data representative of the time span over which the second user has been determined to have viewed the first content part of the digital profile, wherein the viewer data facilitates a modification of the digital profile at the second mobile device.

9. The system of claim 8, wherein the operations further comprise:
based on user identity data associated with a user identity of the first user, allocating an interface template to the user identity, wherein the interface template comprises scorecard data received from the second mobile device and representative of a scoring parameter related to an input field of the interface template.

10. The system of claim 9, wherein the interface template is a first interface template, and wherein the operations further comprise:
in response to a re-allocation condition being satisfied, allocating a second interface template, different than the first interface template, to the user identity.

11. The system of claim 9, wherein the interface template comprises an image from a data store associated with a moderator of the interface template.

12. The system of claim 8, wherein the operations further comprise:
publishing input data, representative of an input to the interface template, in accordance with the digital profile associated with the user identity.

13. The system of claim 12, wherein the input data comprises a statistical value associated with the input to an input field.

14. The system of claim 8, wherein the operations further comprise:
generating statistical data associated with a number of views of the digital profile associated with the user identity.

15. A non-transitory machine-readable medium, comprising executable instructions that, when executed by a processor, facilitate performance of operations, comprising:
receiving an indication that a digital profile associated with a first user identity of a first user has been shared with mobile devices;
generating timestamp data representative of an amount of time that a first content part of the digital profile associated with the first user identity, as opposed to a second content part of the digital profile associated with the first user identity, has been viewed at a first mobile device, of the mobile devices, in association with a second user identity, as opposed to the first user identity, wherein generating the timestamp data comprises generating the timestamp data based at least in part on a location of a user interface element relative to the first content part and a previously defined partition of the digital profile, wherein the previously defined partition was defined prior to the first content part being viewed in association with the second user identity;
in response to generating the timestamp data, enabling the first content part to be posted for viewing by a second mobile device of the mobile devices; and
in response to the indication that the digital profile has been shared with the mobile devices, sending, to a third mobile device, viewer data representative of types of the mobile devices, the timestamp data, and a number of the mobile devices with which the digital profile has been shared.

16. The non-transitory machine-readable medium of claim 15, wherein the operations further comprise:
based on comparing input data to a scoring parameter, generating digital profile data associated with the first user identity to be added to, or usable to modify, the digital profile, resulting in a modified digital profile.

17. The non-transitory machine-readable medium of claim 16, wherein the operations further comprise:
sending modified digital profile data representative of the modified digital profile to the first mobile device.

18. The non-transitory machine-readable medium of claim 15, wherein the operations further comprise:
sending, to the third mobile device, count data representative of a number of times that an interface template has been determined to have been viewed by the mobile devices.

19. The non-transitory machine-readable medium of claim 18, wherein the count data is sent to at least one of the first mobile device or the second mobile device.

20. The non-transitory machine-readable medium of claim 15, wherein the user interface element comprises a scroll bar.

* * * * *